United States Patent [19]

Jacquot et al.

[11] Patent Number: 4,995,975
[45] Date of Patent: Feb. 26, 1991

[54] UNITARY WATER COOLER FILTER

[75] Inventors: William E. Jacquot, Morgan Hill; Richard L. Tettman, Los Gatos; Melvin D. Davis, Santa Clara, all of Calif.

[73] Assignee: Western Temco, Inc., Los Gatos, Calif.

[21] Appl. No.: 540,858

[22] Filed: Jun. 20, 1990

Related U.S. Application Data

[63] Continuation of Ser. No. 282,465, Dec. 9, 1988, abandoned.

[51] Int. Cl.⁵ .............................................. B01D 24/08
[52] U.S. Cl. .................................... 210/266; 210/282; 210/474
[58] Field of Search ............... 210/266, 282, 473, 474, 210/484, 232, 235, 238, 503, 504

[56] References Cited

U.S. PATENT DOCUMENTS

| | | | |
|---|---|---|---|
| 444,013 | 1/1891 | Paddock | 210/474 |
| 967,905 | 8/1910 | Hagg | 210/474 |
| 2,167,225 | 7/1939 | Van Eweyk | 210/473 |
| 2,335,458 | 11/1943 | Senyal | 210/474 |
| 2,389,185 | 11/1945 | Dick | 210/474 |
| 2,502,298 | 3/1950 | White | 210/474 |
| 2,761,832 | 9/1956 | Robb et al. | 210/282 |
| 3,536,197 | 10/1970 | Ward | 210/282 |
| 4,024,991 | 5/1977 | Tyson et al. | 210/474 |
| 4,025,438 | 5/1977 | Gelman et al. | 210/484 |
| 4,094,779 | 6/1978 | Behrman | 210/282 |
| 4,145,291 | 3/1979 | Console et al. | 222/189 |
| 4,151,092 | 4/1979 | Grimm et al. | 210/282 |
| 4,181,243 | 1/1980 | Frahm | 210/282 |
| 4,306,971 | 12/1981 | Hankammer | 210/282 |
| 4,491,250 | 1/1985 | Jaye | 210/282 |
| 4,623,457 | 11/1986 | Hankammer | 210/237 |
| 4,764,274 | 8/1988 | Miller | 210/282 |
| 4,800,018 | 1/1989 | Moser | 210/266 |

*Primary Examiner*—Richard V. Fisher
*Assistant Examiner*—Cynthia L. Nessler
*Attorney, Agent, or Firm*—Irell & Manella

[57] ABSTRACT

A device for filtering and purifying tap water in combination with a conventional water cooler and bottle includes a generally circular annular flange having an outer diameter sufficient to prevent insertion of the flange into the water-receiving chamber of a conventional water cooler, and having an inner diameter dimensioned to accept a water bottle for use in the water cooler, and having a rigidity capable of supporting the water bottle. Depending from the flange, a generally cylindrical canister of water-impervious material, having an outer diameter and length is dimensioned to fit within the water-receiving chamber. A lower retaining means, capable of passing water while retaining a filter medium, is positioned within the canister at its lower end. A silver-impregnated activated carbon filter medium, capable of removing chlorine and absorbable organic chemicals from potable water, positioned on the upper surface of the lower retaining element. An upper retaining element capable of passing water and excluding particulate matter, and capable of retaining the filter medium, is positioned on the upper surface of the filter medium. The distance between the upper perforated panel and the flange, and the inner diameter of the canister, are selected to provide for a flow rate of at least 0.03 oz/sec through the filter device when the filter device is inserted into a water cooler and the neck of a water-containing water bottle placed inverted in the top end of the device.

6 Claims, 4 Drawing Sheets

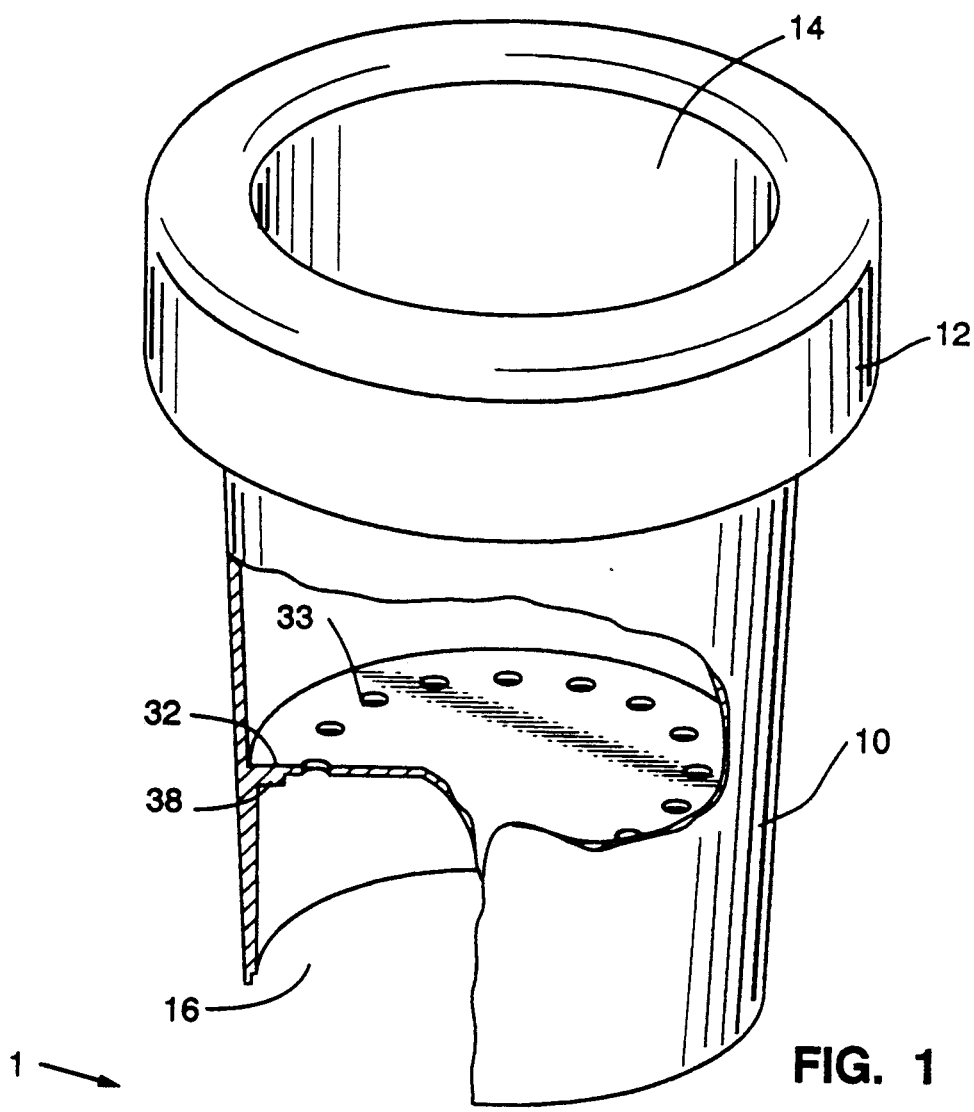
FIG. 1
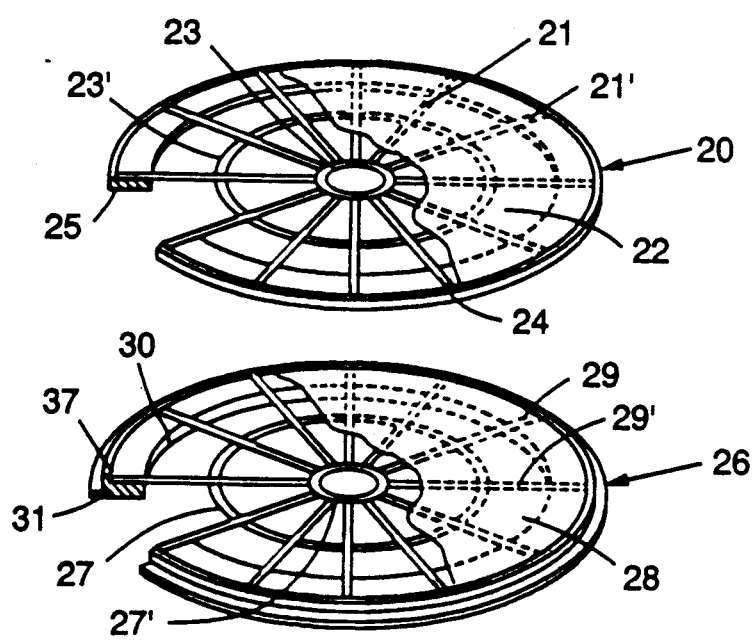

UNITARY WATER COOLER FILTER

This application is a continuation of application Ser. No. 07/282,465 filed, 9 Dec 1988, now abandoned.

TECHNICAL FIELD

This invention relates to the field of treatment and improvement of potable water, particularly for drinking. More particularly, it concerns a device for point of delivery filtration of drinking water.

BACKGROUND OF THE INVENTION

Modern water supplies are subject to contamination from various agents, both environmental and industrial in origin. Although public water supplies are regulated by various governmental agencies, and are ostensibly examined for compliance with standards of purity, such standards are not always met. Occasionally, water supplies are contaminated by illegal dumping of hazardous wastes, which may escape detection if such occurrence falls between inspections. The result, particularly in regions proximal to manufacturing enterprises or waste disposal sites, is that drinking water is subject to contamination from hazardous chemicals leached from the soil or deposited from smoke or vapor. The presence of organic chemicals and minerals often causes, in addition to disagreeable tastes, actual health hazards. As a result, the bottled water industry has experienced nearly explosive growth over the last several years.

As an alternative to foul-tasting, possibly harmful tap water, many consumers have turned to services which provide bottled water in filtered form, often sold as "natural spring water" or the like. The service typically provides a free-standing water cooler, and delivers water in 5 or 3 gallon bottles periodically. The cooler, a device but little changed over the last several decades, receives the bottle and chills and/or heats a quantity of water, maintaining it at a suitable temperature for dispensing. The cooler typically comprises a tall free-standing case containing refrigeration means. The top surface generally has a circular aperture surrounded by a cushioned ring for receiving and supporting the water bottle. In use, a filled bottle is uncapped and inverted into the cooler, so that the bottle comes to rest with the open mouth within the cooler. A quantity of water pours from the bottle, filling a water-receiving chamber immediately under the cooler's upper surface up to a level which touches the neck of the bottle and halts the flow of water out of the inverted bottle. The water may be cooled in this chamber, and held until dispensed by activating the outlet.

The drawback to such a service, however, is expense. Bottled water must be transported and delivered, whether by the consumer or by the service. "Spring water" and the like is frequently transported considerable distances. Also, reliance upon a service to deliver water leaves the consumer at the mercy of the service's delivery schedule. Thus, a need exists for a device to provide filtered, drinkable water while avoiding the need to transport heavy bottles.

Frahm, U.S. Pat. No. 4,181,243 disclosed a device for filtering water which comprises a receptacle having a spigot, wherein the spigot is provided with a filter device having activated charcoal sandwiched between two layers of filter paper held in a cylinder attached to the spigot inside the receptacle. Although this device is capable of use with standard water bottles, it is not easily adaptable to use with a conventional water cooler.

Console et al, U.S. Pat. No. 4,145,291 disclosed a silver-impregnated ceramic device for sterilizing, but not purifying, water stored in a tank or dispenser for drinking.

Senyal, U.S. Pat. No. 2,335,458 disclosed a water filtration device for use with bottled water comprising a long cylinder filled with activated carbon, a filter, and a stopper and tube fitted within the bottleneck. In operation, purifying and flocculating chemicals are added to the bottle and the bottle inverted over the filter. After standing, a valve is opened, and the water allowed to pass to the bottom of the cylinder through a tube, after which it percolates upward through the activated carbon, and is released into a receptacle for dispensing.

Hagg, U.S. Pat. No. 967,905 disclosed a water purifying device having a cone-shaped baffle to prevent sediment from clogging the filtering medium.

Dick, U.S. Pat. No. 2,389,185 disclosed a filter device adapted for attachment to the neck of a canteen or other water bottle, in combination with a sterilizing agent (e.g., chlorine), and preferably a sedimenting agent such as diatomaceous earth. The filter device allows troops to use surface water, "no matter what its condition."

Jaye, U.S. Pat. No. 4,491,520 disclosed a water jug having an integral filter cartridge. Water poured into the top of the container passes through a disk containing activated charcoal sandwiched between sheets of filter paper, and into a small reservoir adjacent to the spigot.

Paddock, U.S. Pat. No. 444,013 disclosed a water pitcher with an internal filter for ice water. The filter comprised a cylinder having a filter medium at the bottom, and supported on the pitcher base.

Miller, U.S. Pat. No. 4,764,274 disclosed a water filter for use with a pitcher or water bottle, comprising a layer of activated carbon sandwiched between two filter pads, and encased in a frustro-conical housing.

Gelman et al, U.S. Pat. No. 4,025,438 disclosed a water filter unit for attachment to a water faucet, comprising an activated carbon layer supported on a micron filter, and covered with a filter having a pore size larger than the supporting filter but smaller than the carbon particle size.

Tyson et al, U.S. Pat. No. 4,024,991 disclosed a device adapted for positioning within a bottle neck to impart silver ions to water, thereby preventing bacterial contamination of the water.

White, U.S. Pat. No. 2,502,298 disclosed a device for filtering water from one bottle into another bottle, comprising a stand, a funnel, where the stand and funnel are dimensioned to seal together and prevent the funnel from overflowing during the filtering operation.

Behrman, U.S. Pat. No. 4,094,779 disclosed a device for filtering water from one bottle into another bottle, comprising a stand, a funnel containing a filter medium (e.g., activated carbon) sandwiched between two layers of filter paper, and valves for regulating the water flow rate out of the upper bottle, and from the funnel into the receiving bottle.

Van Eweyk, U.S. Pat. No. 2,167,225 disclosed a device for filtering water from one bottle into another bottle, comprising a cylinder capable of supporting a full bottle, filled with a filter medium (e g., silver-impregnated partially exhausted zeolite). The cylinder is screwed onto the empty receiving bottle, and the filled supply bottle is inverted into the open mouth of the filter cylinder.

Hankammer, U.S. Pat. No. 4,623,457 disclosed another water pitcher having a filter medium encased in the lid portion of the pitcher. Water is added to the pitcher through the lid, where it is filtered and passed to the main body of the pitcher until it is dispensed.

DISCLOSURE OF THE INVENTION

We have now invented a water purifying filter device capable of removing chlorine, organic chemicals, particulates, and bacteria from potable water. This device may be used with a conventional water cooler and is configured for insertion into the water cooler's bottle-receiving aperture which is typically located on the top surface of the cooler. In use, the device of this invention is placed in the aperture and then a filled water bottle is inverted with its neck placed in the device. The device provides filtration of the water from the inverted bottle at a flow rate sufficiently high that users will not notice a substantial restriction in flow as compared to the flow of water normally observed from bottled water systems. In practice, the consumer may fill a standard 5 or 3 gallon water bottle with ordinary tap water: after passage through the filter device of the invention, the water is of a quality equal or superior to that of commercial bottled water or spring water.

The device comprises a cylinder having an open top end and a closed but porous bottom end. The open top end of the cylinder is formed into an outwardly flaring flange (i.e., lip or shoulder). The cylinder and this outwardly flared flange are sized to receive the neck of a water bottle and to provide a rest for the body of the bottle. The flange is capable of supporting the weight of a filled water bottle. At the lower end of the cylinder is provided a water permeable filter medium comprising activated carbon impregnated with silver, sandwiched between two micron filter pads. The entire cylinder (except for the flange) fits within the bottle receiving aperture and water receiving chamber of a conventional water cooler, and provides sufficient filter surface area to allow high flow rates through the filter medium. The length of the cylinder and the height of the flange are such that when a bottle is inverted into the device and water flows through the filter it enters the water receiving chamber and rises to level which meets and contacts the open end of the water bottle inverted into the device.

BRIEF DESCRIPTION OF THE DRAWINGS

In this description of the invention reference will be made to the accompanying drawings in which:

FIG. 1 is an exploded view of one embodiment of the invention;

DETAILED DESCRIPTION AND PREFERRED EMBODIMENTS

Figure 2:
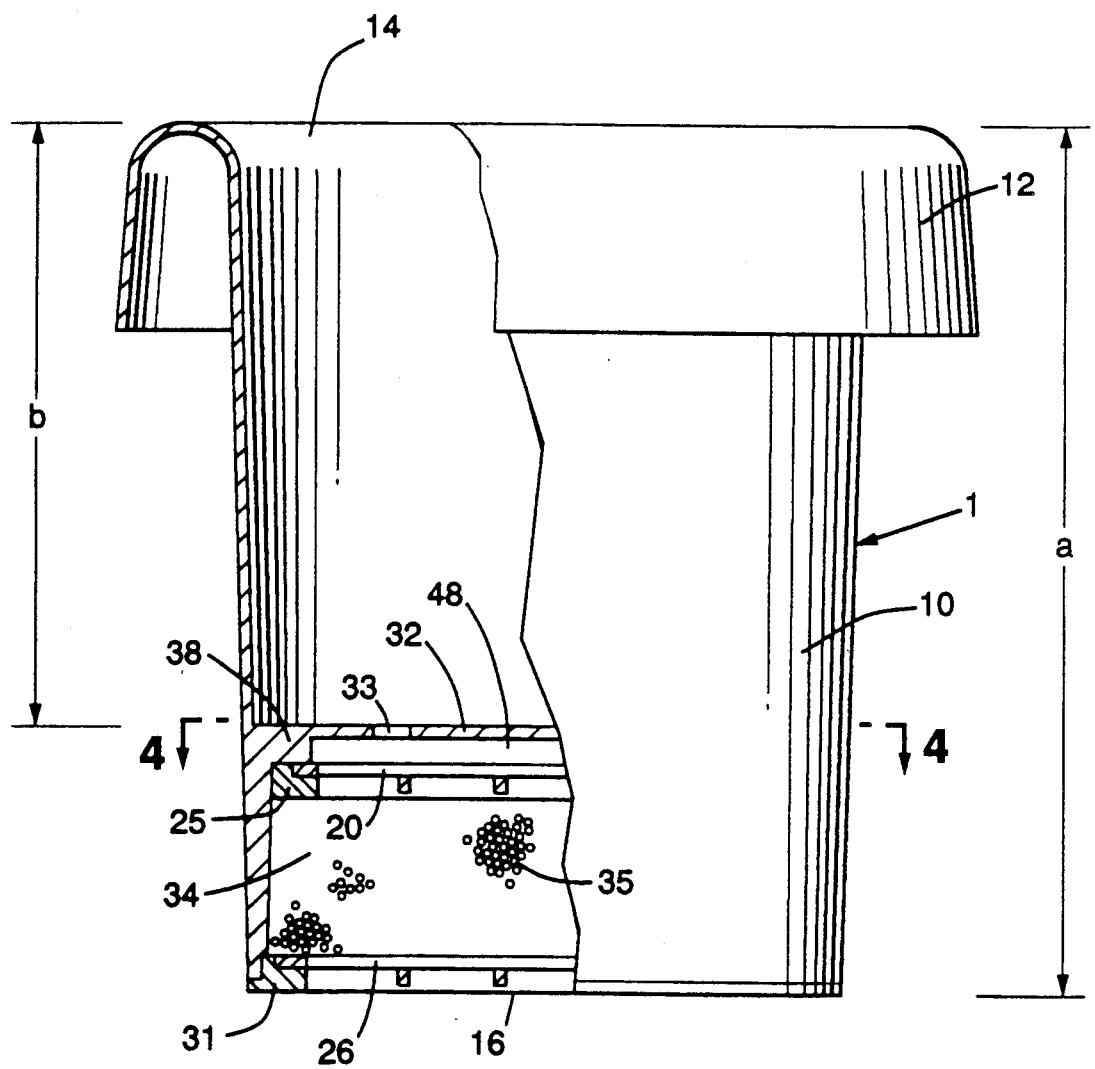
FIG. 2 is a side view of the device of FIG. 1 in partial cutaway.
Figure 3:
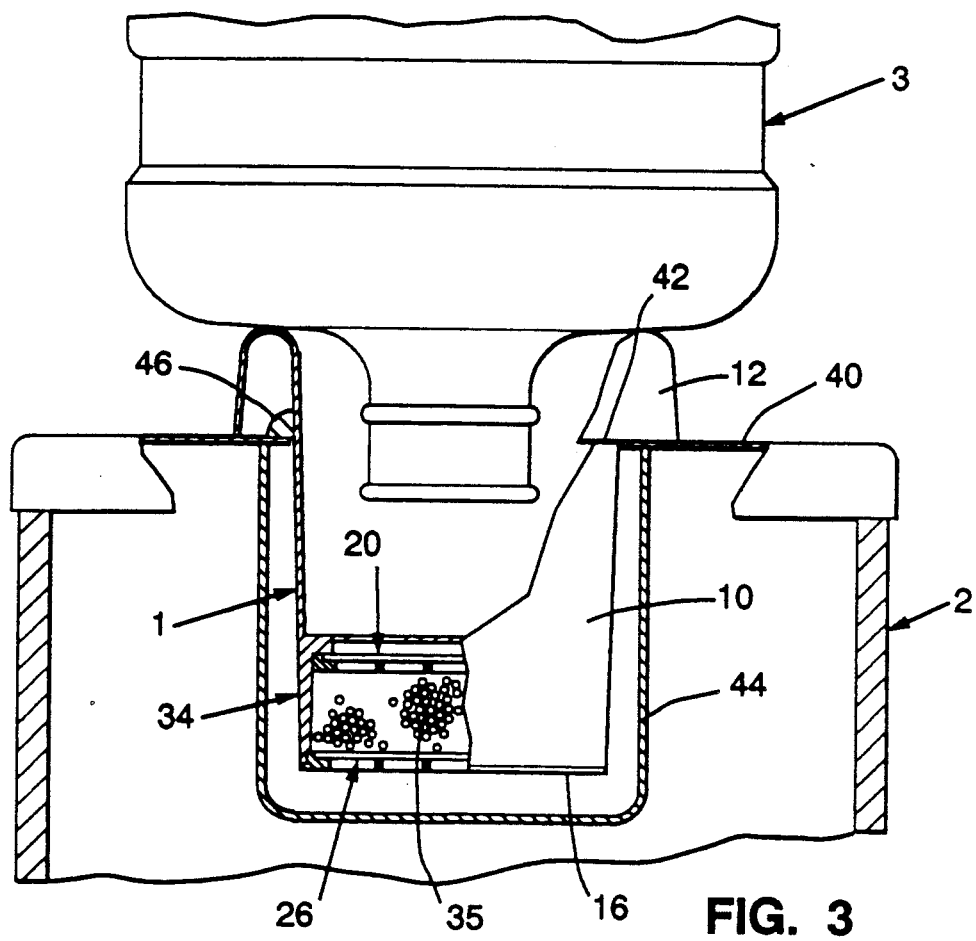
FIG. 3 is a cutaway view of a device of FIG. 1 in place in a conventional water cooler.

A presently preferred embodiment of the device of this invention is depicted in FIGS. 1 and 2 and shown in operation in FIG. 3. Details of the device of FIGS. 1 and 2 are provided in FIGS. 4 through 7. The device 1 comprises a generally cylindrical canister body 10 having a substantially rigid flange 12 at one end 14. This end 14 carrying the flange 12 is open. The flange 12 is outwardly flaring and is capable of supporting the weight of the entire device when filled with water, as well as the weight of a filled 5 gallon water bottle.

As can be seen in FIG. 3, canister body 10 has a diameter which will fit within the bottle aperture of a water cooler. The flange 12 has an exterior diameter which exceeds the diameter of the cooler bottle aperture such that, in use, the lower surface of the flange engages and rests upon the solid top surface of the cooler surrounding the water cooler bottle aperture. The body and flange are formed from nontoxic materials suitable for use with potable water, typically inert castable plastics such as polyvinylchloride, polypropylene, polyethylene, ABS, and the like.

The lower end 16 of the canister body 10 contains the filter assembly. This includes an upper filter-retainer 20 and a lower filter-retainer 26. These filter-retainers are porous and are sealably joined to the inside of the canister in a spaced parallel configuration so as to define a cavity between them. This cavity 34 houses a bed of filter medium 35 as detailed in FIG. 2. The upper filter-retainer 20 includes a filter sheet 22 having a thickness of about 0.10" and capable of retaining micron size particles supported by a supporting member 24. The periphery of support 24 can be formed into a sealing ring 25. This ring is sized to be glued or otherwise fastened to the interior of canister 10 so as to prevent water from passing around the filter instead of passing through it. Canister 10 may be provided with an internal flange 38 to facilitate proper positioning and attachment of the upper filter-retainer 20. Support 24 as shown includes a plurality of radial ribs 21, 21', etc joined by annular ribs 23 and 23'.

Figure 5:
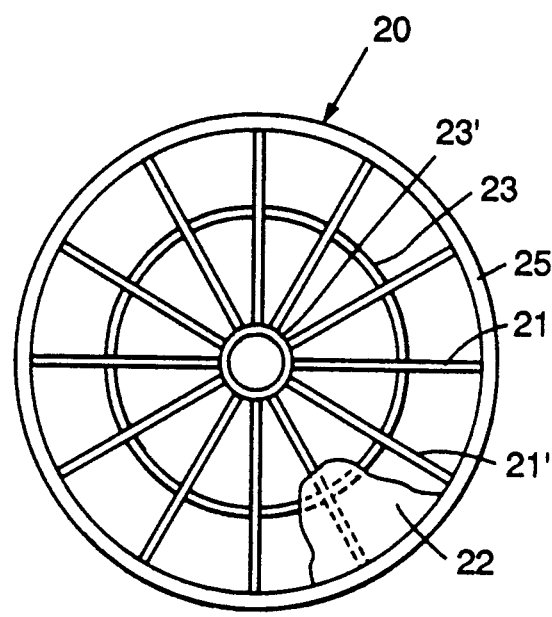
FIG. 5 is a partially cut away top view of a top filter-retainer used in the device of FIG. 1.
Figure 6:
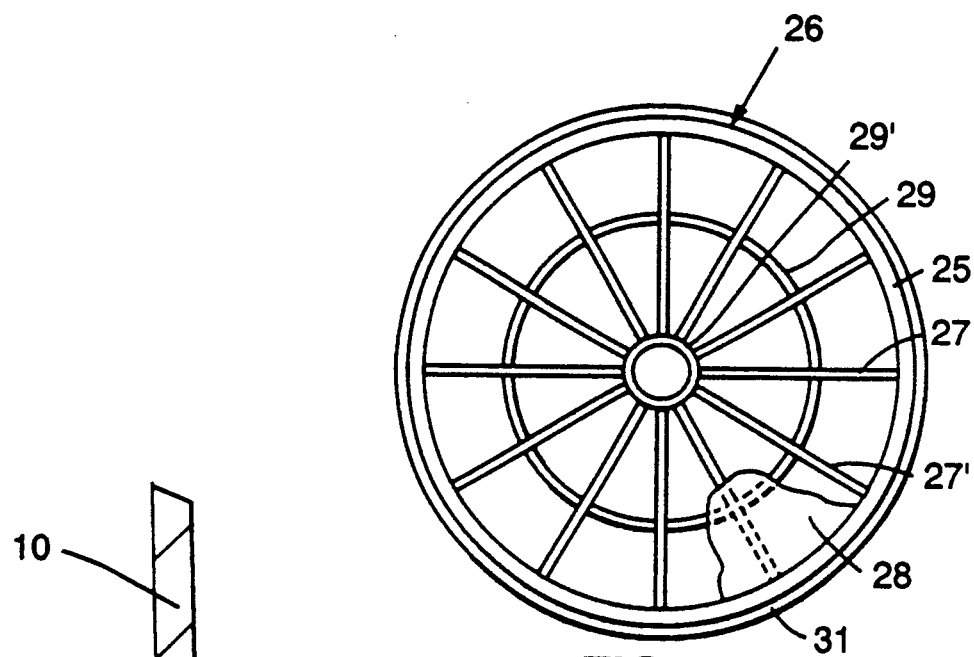
FIG. 6 is a partially cut away top view of a bottom filter-retainer used in the device of FIG. 1.

Filter sheet 22 is preferably a polyester-filled pad. Supporting member 24 is also formed from materials suitable for use with potable water, such as the plastics described above as suitable for forming the body and flange of the device. The supporting member 24 may be die-cast, injection molded, and the like. The support member configuration depicted in FIG. 5 is merely representative. It will be apparent to one of ordinary skill in the art that other configurations capable of supporting a micron filter pad may be substituted.

The filter sheet 22 is attached to support 24 by any suitable means, typically be bonding such as with the use of FDA-acceptable adhesives, or preferably by use of ultrasonic bonding, for example using a Branson Model Series 8400 ultrasonic welding machine (Branson Ultrasonics Corp., Danbury CT).

Lower filter-retainer 26 is similar to and preferably substantially identical to upper filter-retainer 20 in terms of materials of construction and the like. It includes filter sheet 28 and support 30 made up of radial ribs 27, 27', etc., and annular ribs 29 and 29' and an outer annular rib which may, if desired include seal ring positioning flange 31 as detailed in FIG. 6.

Figure 7:
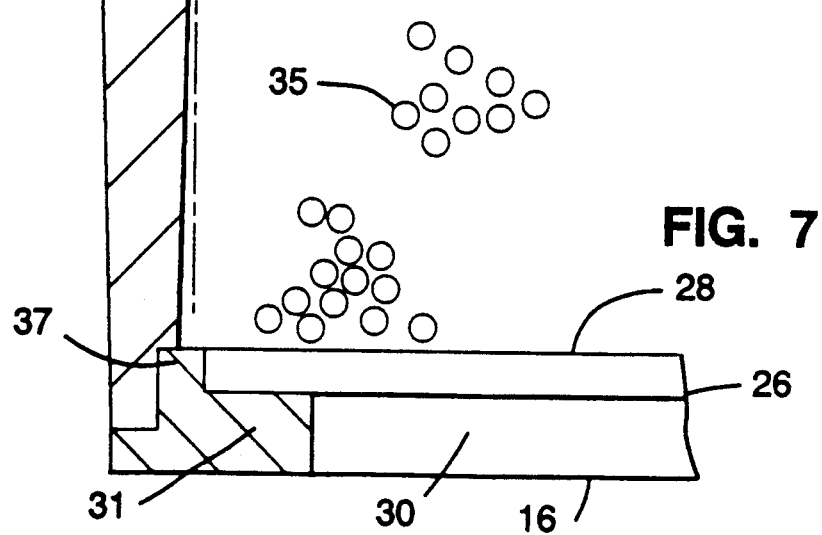
FIG. 7 is an expanded scale vertical cross-sectional view of the lower portion of the device of FIG. 1 taken so as to provide details of its construction.

The filter sheet 28 may be of the same material as the filter sheet 22 in upper filter 20, and may be bonded to lower support member 30 in the same manner as upper filter sheet 22 is bonded to upper support 24. As shown in FIG. 7, lower support member 30 may have a positioning flange 31 to insure that the lower retaining means is positioned at the bottom of canister 10 and forms a water-tight seal therewith. Canister 10 may additionally be provided with a ledge 37 to insure that lower support member 30 seats and seals properly against the canister wall. As shown in FIG. 7, the inner surface of canister 10 may be flared outward below flange 38 in order to facilitate insertion of upper filter-retainer 20. As also shown in FIGS. 2 and 7, the outer surface of canister 10 may be tapered inward toward the lower end to facilitate insertion into a water cooler reservoir. The device illustrated in FIGS. 2 and 7 tapers from the flange 12 to the bottom opening 16. Such taper also aids in fabrication of the device by injection molding.

The volume 34 defined by filter-retainer assemblies 20 and 26 is occupied by a silver-impregnated activated carbon filter medium 35. Medium 35 is most easily inserted after upper assembly 20 has been put in place, and before lower assembly 26 is attached, with the canister body 10 inverted. Medium 35 preferably comprises a granular activated carbon having a particle size of about 20×50 U.S. standard sieve, and has metallic silver chemically plated in ratios of about 0.026% to about 1.05%. Suitable media are available commercially, for example under the name Hygene Mark I, Hygene Mark II, and the like (Ionics, Inc., Bridgeville, Pa.). The quantity of silver employed must be sufficient to render medium 35 bacteriostatic. The granule size and packing density of medium 35 are adjusted in concert with the porosity of filters 22 and 28 in order to insure a flow rate of at least 0.03 oz/sec through the filter.

Figure 4:
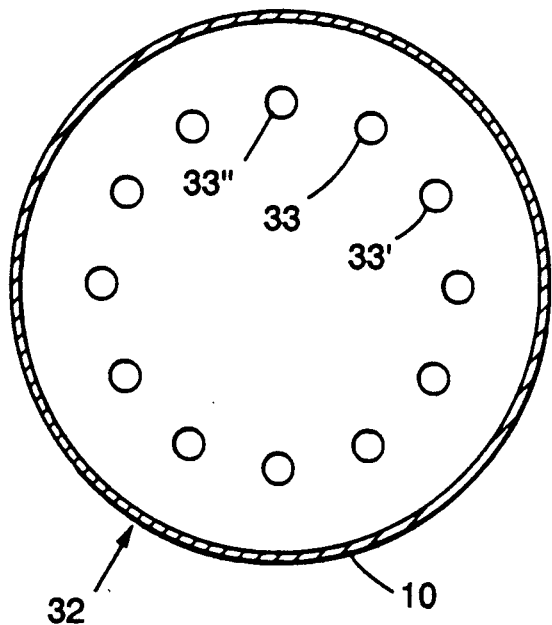
FIG. 4 is a horizontal cross-sectional view of a device of FIG. 1 taken so as to provide top view details of its water distribution baffle.

The device may optionally be provided with a baffle 32 having perforations 33 positioned to distribute water evenly over the upper filter-retainer. A suitable representative baffle configuration is depicted in FIG. 4. The baffle 32 may be formed as an integral part of canister 10, e.g., by injection molding, or may be formed separately and fastened into position in the same manner as the two retainers 20 and 26. If baffle 32 is formed as an integral part of canister 10, the lower portion of the baffle may conveniently serve as flange 38. Alternatively, if provided separately, baffle 32 may be bonded to the upper surface of flange 38, while filter-retainer 20 is bonded to the lower surface of the flange, thus allowing space between baffle 32 and filter 22.

Typically, the device of this invention is fabricated as follows. First, canister 10 is inverted. The upper filter-retainer 20 is then inserted into canister 10, and is fixed with adhesive or ultrasonic bonding to insure a water-tight seal. Then filter medium 35 is added, and the lower filter-retainer retainer 26 is bonded in place, forming a water tight seal around the ring.

FIG. 3 depicts a device of the invention 1 positioned in a conventional water cooler 2, for example a Model EBAHC-1 Hot and Cold Cooler (Elkay Mfgr. Co., Oak Brook, Ill.), and supporting a water bottle 3. Water cooler 2 has an upper surface 40 including a bottle-receiving aperture 42 and a water reservoir 44, frequently surrounded by collar 46. Collar 46 is typically provided to support bottle 3, and is usually permanently attached to surface 40. Flange 12 is preferably dimensioned to bypass collar 46, and to rest directly on upper surface 40. Flange 12 supports bottle 3 and suspends canister 12 within reservoir 44.

In operation, canister 10 is inserted into reservoir 44 until flange 12 comes to rest on upper surface 40. A filled water bottle 3, typically 3 gallon or 5 gallon, is then opened and inverted into aperture 14 and canister 10. Water flows from bottle 3 into the upper portion of canister 10 and is diverted by baffle 32 through perforations 33 into space 48 between baffle 32 and retainer-filter 20. Water then flows through upper filter 22, which retains all particles larger than micron size, and into medium 35, which filters absorbable organic chemicals, halogens, and microbes from the water. The amount of medium 35 employed is determined by its ability to remove these impurities during passage of the water. The water then passes through lower filter 28 and into reservoir 44 until the water level within the reservoir is slightly above the bottle opening. Distance a and distance b (FIG. 2) are determined so that (1) there is sufficient space for medium 35, and (2) there is sufficient volume 38 above baffle 32 to provide a water head guaranteeing adequate flow rate.

When properly adjusted, the flow rate provided with the device in place will be such that normal withdrawal of water from the cooler will not be reduced. Thus, a flow rate through the filter device equal to the spigot flow rate will be adequate. Higher flow rates are also acceptable, as long as the water is retained in the filter medium for a period of time sufficient to remove absorbable organic chemicals, chlorine, and microbes. This flow rate, however, neglects the presence of water in the reservoir. As water coolers are typically not operated continuously, it is acceptable to reduce the filter flow rate and rely on water within the reservoir, so long as the filter flow rate is sufficient to replenish the reservoir before it is emptied in normal use. A filter flow rate of 0.03 ounces per second (oz/sec) or greater is an acceptable filter flow rate. A flow rate of about 0.3 oz/sec or greater is presently preferred.

Water cooler reservoirs have fairly similar dimensions, thus allowing the device of the invention to be suitable for the majority of coolers commercially available. However, in the event that a particular cooler reservoir is of insufficient depth, one may insert a spacing ring (not shown) between the flange 12 and upper surface 40 to raise the device in order to clear the lower surface of the reservoir. The spacing ring may be of any suitable material, and is preferably shaped to accommodate any collar 46 which may be present.

It will be appreciated that the device of this invention will have the property of raising the level of water within the cooler reservoir. This is because the water level is defined by the level to which the lower rim surface Of the inverted bottle extends. The present device is placed between the bottle and the cooler and raises the bottle (and thus the water level) by an amount related to the height of the outwardly flaring flange. Therefore the effective height of the flange should be not greater than about 3" so as to avoid any problems with overflow from the cooler water reservoir 44. The term "effective height" refers to the distance that the device raises the water level. Depending upon the internal taper or bevel of the bottle receiving flange end of the device, the effective height of the device may be substantially less than the actual height of the flange.

Variations of the above-described device will be apparent to those skilled in the art, and are to be considered within the scope of the claimed invention.

What is claimed:

1. A filter device for use in a water cooler, said cooler having a base, a water outlet, a generally planar upper surface having a circular orifice of receiving the neck of an inverted water bottle and a reservoir chamber for receiving water from said inverted bottle prior to dispensing said water, wherein said filter device is adapted for fitment within said circular orifice and wherein it comprises a unitary hollow cylindrical housing having an open top end and an open bottom end, said housing including a hollow cylindrical canister body formed of a water-impervious material and having an outer diameter small enough to fit within the circular orifice of the cooler and an axial length dimensioned to fit within the said reservoir chamber and an axial length and an inner diameter large enough to receive the neck portion of the inverted water bottle, said canister body at its open top end continuously flaired outwardly and then downwardly to form.

a downwardly facing circular flange, said flange being hollow with an inner wall, a top surface and a downwardly depending outer wall and open at its bottom surface, said flange being coaxial with the canister body and having an diameter for its downwardly depending outer wall which exceeds the diameter of the circular orifice such that when the canister body of the device is inserted into the circular orifice, the open bottom surface of said flange rests upon the upper surface of the water cooler, said flange being made of the same material as the canister body and being of a thickness and rigidity in its top surface and outer wall which is adequate to support the inverted water bottle and transmit the weight of the water bottle to the upper surface of the water cooler and a perforated baffle continuous with said canister body and extending radially across the hollow canister body at a position below the distance to which the neck of the inverted water bottle extends;

a lower retaining means capable of passing water while retaining a filter medium, positioned within said housing at the lower end thereof;

a silver-impregnated activated carbon filter medium capable of removing chlorine and absorbable organic chemicals from potable water, positioned on the upper surface of said lower retaining means; and an upper retaining means capable of passing water and excluding particulate matter, and capable of retaining said filter medium, positioned on the upper surface of said filter medium;

wherein the distance between said upper perforated panel and said flange, and the inner diameter of said housing, are selected to provide for a flow rate of at least 0.03 oz/sec through said filter device when said filter device is inserted into a water cooler and the neck of a water-containing water bottle placed inverted in the top end of said housing.

2. The device of claim 1 wherein said silver-impregnated activated carbon filter medium comprises granular activated carbon having a particle size of about $20 \times 50$ U.S. standard sieve, having metallic silver chemically plated in ratios of about 0.026% to about 1.05%.

3. The device of claim 1 wherein said upper retaining means and lower retaining means comprise micron filter pads bonded to axially ribbed upper and lower support means.

4. The device of claim 1 wherein the exterior surface of said canister body is tapered toward the bottom end.

5. The device of claim 1 further comprising an internal positioning flange situated to position said upper retaining means.

6. The device of claim 5 wherein the interior surface of said canister body is flared from said internal positioning flange out to the lower end of said canister body.

* * * * *